(12) United States Patent
Tsirkin et al.

(10) Patent No.: US 12,175,271 B2
(45) Date of Patent: Dec. 24, 2024

(54) REDUCING LATENCY FOR NESTED VIRTUAL MACHINES

(71) Applicant: Red Hat, Inc., Raleigh, NC (US)

(72) Inventors: Michael Tsirkin, Raanana (IL); Amnon Ilan, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 679 days.

(21) Appl. No.: 17/305,033

(22) Filed: Jun. 29, 2021

(65) Prior Publication Data
US 2022/0413884 A1 Dec. 29, 2022

(51) Int. Cl.
*G06F 9/455* (2018.01)
*G06F 9/4401* (2018.01)
*G06F 9/48* (2006.01)

(52) U.S. Cl.
CPC ........ *G06F 9/45558* (2013.01); *G06F 9/4418* (2013.01); *G06F 9/4812* (2013.01); *G06F 2009/45566* (2013.01); *G06F 2009/45575* (2013.01); *G06F 2009/45595* (2013.01)

(58) Field of Classification Search
CPC .. G06F 9/45558; G06F 9/4418; G06F 9/4812; G06F 2009/45595; G06F 2009/45566; G06F 2009/45575
See application file for complete search history.

(56) References Cited

U.S. PATENT DOCUMENTS

| | | |
|---|---|---|
| 8,327,353 B2 | 12/2012 | Traut |
| 8,490,090 B2 | 7/2013 | Ben-Yehuda et al. |
| 8,819,647 B2 | 8/2014 | Mitran |
| 9,122,509 B2 | 9/2015 | Deng et al. |
| 9,176,767 B2 | 11/2015 | Cantu |
| 10,324,863 B2 | 6/2019 | Lemay |
| 10,437,627 B2 | 10/2019 | Hu et al. |
| 10,452,420 B1 * | 10/2019 | Koryakin ............ G06F 9/45558 |
| 10,467,033 B2 | 11/2019 | Tian et al. |
| 10,831,532 B2 | 11/2020 | Castet |

(Continued)

FOREIGN PATENT DOCUMENTS

CN 108920255 11/2018

OTHER PUBLICATIONS

Temelkova, Katerina, "Nested Virtualization and PCI Passthrough with KVM and OpenNebula", https://storpool.com/blog/nested-virtualization-with-kvm-and-opennebula, Nov. 26, 2019, 17 pages.

(Continued)

*Primary Examiner* — Michael W Ayers
(74) *Attorney, Agent, or Firm* — Womble Bond Dickinson (US) LLP

(57) ABSTRACT

System and method for reducing latency for nested virtual machines. An example method may include: running, by a host computer system, a hypervisor managing a first virtual machine associated with a first virtual processor (vCPU) implemented by a first processing thread, wherein the first virtual machine manages a second virtual machine; creating, by the hypervisor, a second processing thread implementing a second vCPU associated with the second virtual machine; and responsive to receiving an interrupt directed to the second virtual machine, causing, by the hypervisor, the second processing thread to process the interrupt.

20 Claims, 7 Drawing Sheets

(56) References Cited

U.S. PATENT DOCUMENTS

| | | | | |
|---|---|---|---|---|
| 2010/0169882 | A1* | 7/2010 | Ben-Yehuda | G06F 9/45537 718/1 |
| 2011/0179417 | A1* | 7/2011 | Inakoshi | G06F 9/45558 718/1 |
| 2012/0131574 | A1* | 5/2012 | Day, II | G06F 9/45558 718/1 |
| 2014/0164662 | A1* | 6/2014 | Van Schaik | G06F 13/34 710/265 |
| 2014/0229648 | A1* | 8/2014 | Tsirkin | G06F 13/24 710/269 |
| 2015/0378762 | A1 | 12/2015 | Saladi et al. | |
| 2016/0085568 | A1 | 3/2016 | Dupre et al. | |
| 2018/0181418 | A1 | 6/2018 | Elangovan et al. | |
| 2018/0373561 | A1* | 12/2018 | Nassi | G06F 11/3433 |
| 2019/0042476 | A1* | 2/2019 | Chhabra | G06F 21/85 |
| 2019/0087223 | A1* | 3/2019 | Bhandari | G06F 9/4812 |
| 2019/0108051 | A1 | 4/2019 | Wang et al. | |
| 2019/0370048 | A1* | 12/2019 | Neiger | G06F 9/4812 |
| 2019/0370049 | A1* | 12/2019 | Gopalan | G06F 9/45558 |
| 2020/0341790 | A1* | 10/2020 | Tsirkin | G06F 1/28 |
| 2022/0308867 | A1* | 9/2022 | Sondag | G06F 9/45558 |

OTHER PUBLICATIONS

Kauer, Bernhard et al., "Recursive Virtual Machines for Advanced Security Mechansims", http://di.fc.ul.pt/~bessani/publications/dcdv11-recursivevm.pdf, Universidade de lisboa faculdade de Ciencias LaSIGE, 6 pages.

Amaral, Marcelo et al., "Performance Evaluation of Microservices Architectures using Containers", https://core.ac.uk/download/pdf/81578653.pdf, Technical University of Catalonia (UPC Barcelona Supercomputing Center (BSC); IBM T. J. Watson Research Center, Yorktown Heights, NY, 2015 IEEE, 8 pages.

Ben-Yehuda, Muli et al., "The Turtles Project: Design and Implementation of Nested Virtualization", 9th USENIX Symposium on Operating Systems Design and Implemenation, Oct. 4-6, 2010, Vancouver, BC, Canada, http://www.usenix.org/events/osdi10/tech/full_papers/Ben-yehuda.pdf, pp. 1-14.

Lim, J.T et al., "Optimizing Nested Virtualization Performance Using Direct Virtual Hardware", ACM ISBN 978-1-4503-7102-5/20/03, https://doi.org/10.1145/337373376.3378467, Session 7A: Virtualized environments-Take the blue pill, ASPLOS'20, Mar. 16-20, 2020, Lausanne, Switzerland, pp. 557-574.

* cited by examiner

REDUCING LATENCY FOR NESTED VIRTUAL MACHINES

TECHNICAL FIELD

The present disclosure is generally related to virtualized computer systems, and more particularly, to reducing latency for nested virtual machines.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
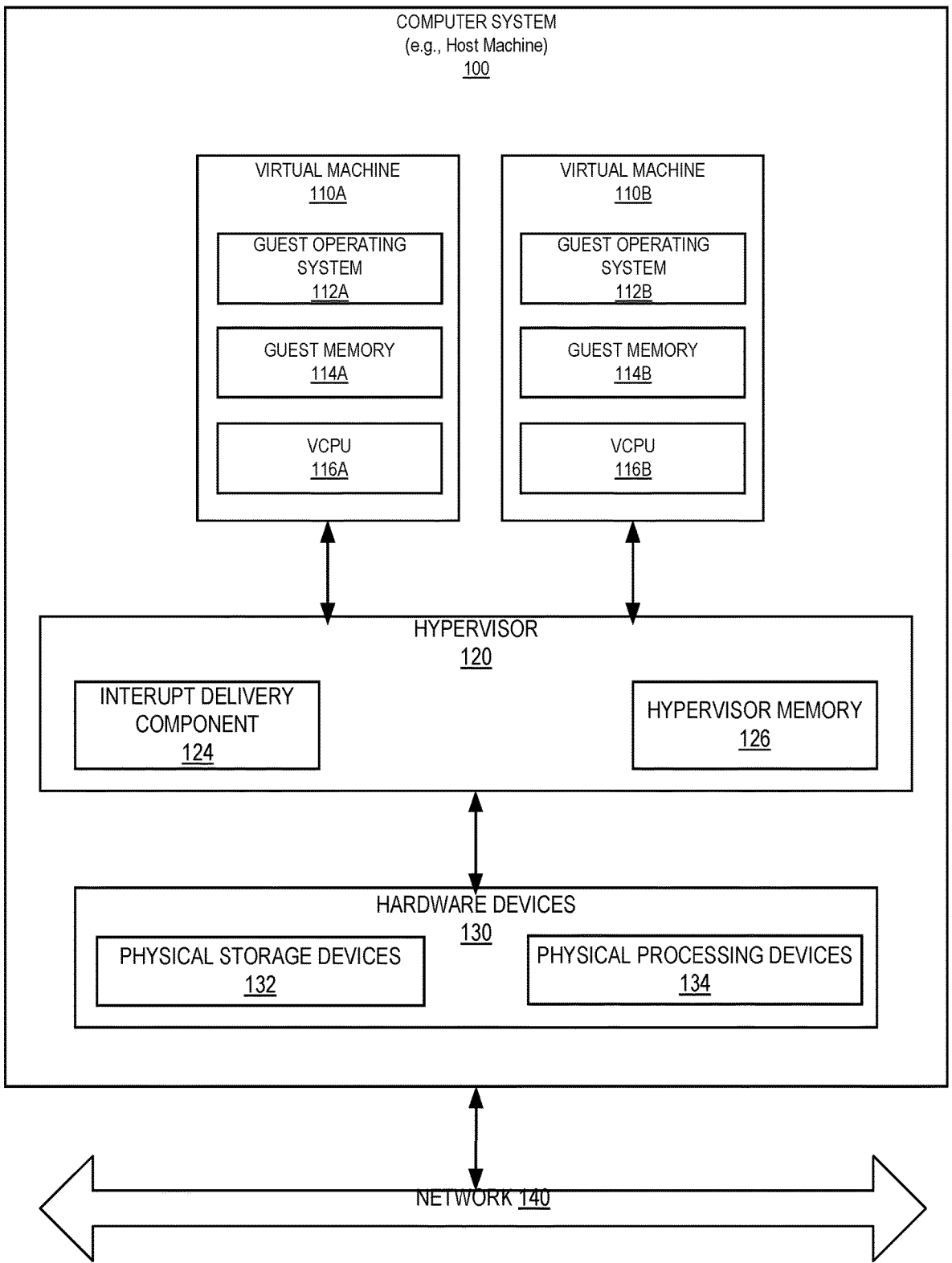
FIG. 1 depicts a high-level block diagram of an example host computer system that creates processing threads for each nested virtual machine to reduce latency, in accordance with one or more aspects of the present disclosure.

Described herein are systems and methods for reducing latency for nested virtual machines. Certain processor architectures support virtualization by providing special instructions for facilitating virtual machine execution. In certain implementations, a processor may support executing a virtual machine monitor (VMM) (or "hypervisor") that acts as a host and has full control of the processor and other platform hardware. A VMM presents a virtual machine with an abstraction of one or more virtual processors. A VMM is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. The software executing in a virtual machine is executed at the reduced privilege level so that the VMM can retain control of platform resources.

A transition from the reduced privilege execution level (also referred to as VMX non-root operation in certain processor architectures) to the VMM context (i.e., privileged execution level) is referred to as a VM exit. To return (e.g., transition) to the reduced privilege execution level from the VMM context a processor instruction (e.g., VMResume instructions) is executed by the processor. In some instances, a virtual machine running at the reduced privilege execution level may be idle, in which case to transition to the reduced privilege execution level the processor executes a processor instructions (e.g., VMEnter instructions) to transfer the execution control to the virtual machine.

Interrupts and exceptions are events that indicate that a condition exists in the system, the processor, or within the currently executing task that requires attention of a processor. The action taken by the processor in response to an interrupt or exception is referred to as servicing or handling the interrupt or exception which typically causes latency in the processor. Interrupts occur at random times during the execution of a program, e.g., in response to signals from physical devices (e.g., requests to service peripheral devices). An interrupt may be addressed to any subset of processors within the system. In a computer system running one or more virtual machines, interrupts may be virtualized by the hypervisor identifying one or more virtual processors for servicing an outstanding interrupt and routing (or injecting) the interrupt message to the identified virtual processors (also referred to as virtual central processing units (vCPU)). Injectable interrupts include external interrupts, non-maskable interrupt (NMI), processor exceptions, software generated interrupts, system management interrupts, initialization interrupts, reset interrupts and software traps.

Nested virtualization refers to virtualization that runs inside an already virtualized environment. In nested virtualization, a hypervisor (hereafter "Level 0 hypervisor")

controls physical hardware resources (e.g., bare metal). One or more first virtualized environments (hereafter "Level 1 VM") may run as virtual machine(s) managed by the Level 0 hypervisor. Each Level 1 VM may run its own set of VMs. These VMs can be referred to as Level 2 VMs. Each level indicates a ring of privilege and access to computing resources of a computer system, where Level 0 indicates a most privileged ring within an architecture of the computer system, and incremental levels indicate less privileged rings (e.g., Level 2 VM is less privileged that Level 1 VM). The Level 1 VM may control execution of the Level 2 VM(s).

Accordingly, in nested virtualizations when an interrupt occurs at the processor which is under the control of the Level 0 hypervisor and the guest virtual machines (e.g., Level 1 VM and Level 2 VM) are idle, the Level 0 hypervisor injects the interrupt into the Level 1 VM causing a VMExit from Level 0 hypervisor and a VMEnter to Level 1 VM due to Level 1 VM being idle. The processor subsequently injects the interrupt into Level 2 VM from Level 1 VM causing another VMExit from Level 1 VM and a VMEnter to Level 2 VM due to Level 1 VM being idle. Injecting an interrupt may be performed by writing, into a memory buffer accessible by the destination virtual machine, a message specifying parameters of the interrupt. As a result of the nested virtualization, waking up Level 1 and Level 2 VM from idle causes an extra VMExit and VMEnter which increases the latency of handling the interrupt.

Aspects of the present disclosure address the above-noted and other deficiencies by providing technology that reduces the latency for nested virtual machines. In particular, aspects of the present disclosure provide technology that allows a guest (Level 2 VM) virtual machine with a virtual central processing unit (vCPU) to be created from a Level 1 VM on a new and separate processing thread of the Level 0 hypervisor. In an example, the host computer system can run a Level 0 hypervisor managing a Level 1 VM on a first processing thread of the Level 0 hypervisor and a Level 2 VMs on a second processing thread of the Level 0 hypervisor, whereby Level 1 VM has control over the Level 2 VMs. Depending on the embodiment, each guest (e.g., Level 1 VM, Level 2 VM, etc.) may have one or more vCPU (e.g., one or more processing threads of the Level 0 hypervisor). When an interrupt occurs at Level 0 hypervisor, Level 0 hypervisor injects the interrupt into Level 1 VM or Level 2 VM by sending the interrupt message directly to the vCPU of the Level 1 VM or vCPU of the Level 2 VM. For example, to inject the interrupt into Level 2 VM when the Level 2 VM is idle, the interrupt is injected into vCPU of Level 1 VM causing a VMExit from Level 1 VM to Level 0 hypervisor. At which point, a VMEnter instruction performed, thus transferring the execution control to the vCPU of Level 2 VM, thus waking up the vCPU of Level 2 VM and causing it to receive the interrupt directly into the vCPU of Level 2 VM from the Level 0 hypervisor.

Various aspects of the above referenced methods and systems are described in details herein below by way of examples, rather than by way of limitation. The examples provided below discuss a virtualized computer system where interrupt handling may be initiated by aspects of a hypervisor, but a host operating system, a virtual machine, or a combination thereof. In other examples, the interrupt handling may be performed in a non-virtualized computer system that is absent a hypervisor or other virtualization features discussed below.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computing device 100 may be a computing device implemented with x86 hardware. In another example, computing device 100 may be a computing device implemented with PowerPC®, SPARC®, or other hardware. In the example shown in FIG. 1, computing device 100 may include virtual machines 110A and 110B, hypervisor 120, hardware devices 130, and a network 140.

Virtual machines 110A and 110B may execute guest executable code that uses an underlying emulation of the physical resources. The guest executable code may include a guest operating system, guest applications, guest device drivers, etc. Each of the virtual machines 110A and 110B may support hardware emulation, full virtualization, para-virtualization, operating system-level virtualization, or a combination thereof. Virtual machines 110A and 110B may have the same or different types of guest operating systems, such as Microsoft®, Windows®, Linux®, Solaris®, etc. Virtual machines 110A and 110B may execute guest operating systems 112A and 112B that manage guest memory 114A and 114B and virtual central processing units (vCPU) 116A and 116B respectively.

Guest memory 114A and 114B may be any virtual memory, logical memory, physical memory, other portion of memory, or a combination thereof for storing, organizing, or accessing data. Guest memory 114A and 114B may represent the portion of memory that is designated by hypervisors 120 for use by one or more respective virtual machines 110A and 110B. Guest memory 114A and 114B may be managed by guest operating system 112A and 112B. Hypervisor memory 126 (e.g., host memory) may be the same or similar to the guest memory but may be managed by hypervisor 120 instead of a guest operating system. The memory allocated to guests may be a portion of hypervisor memory 126 that has been allocated by hypervisor 120 to virtual machines 110A and 110B and corresponds to guest memory of virtual machine 114A and 114B. Other portions of hypervisor memory may be allocated for use by hypervisor 120, a host operating system, hardware device, other module, or a combination thereof.

Hypervisor 120 may also be known as a virtual machine monitor (VMM) and may provide virtual machines 110A and 110B with access to one or more features of the underlying hardware devices 130. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130, and may manage execution of virtual machines 110A and 110B on a host machine. This includes provisioning resources of a physical central processing unit ("CPU") to each virtual machine 110A and 110B running on the host machine. Provisioning the physical CPU resources may include associating one or more vCPUs 116A and 116B with each virtual machine 110A and 110B. vCPU 116A and 116B may be provisioned by a core of the physical host CPU or a number of time slots reserved from one or more cores of the physical host CPU. Each of vCPU 116A and 116B may be implemented by a corresponding execution thread that is scheduled to run on a physical host CPU. Software executing in virtual machines 110A and 110B may operate with reduced privileges such that hypervisor 120 retains control over resources. Hypervisor 120 retains selective control of the processor resources, physical memory, interrupt management, and input/output ("I/O"). In the example shown, hypervisor 120 may include an interrupt delivery component 124. The interrupt delivery component 14 may enable nesting of virtual machine 110B in virtual machine 110 based on multiple processing threads, interact with interrupt management to perform context switching between processing threads to handle interrupts, and an interface to manage the nested virtual machines across different processing threads.

In the shown example, virtual machine 110A is managed by hypervisor 120, and based on a request for a nested virtual machine 110B to be managed by virtual machine 110A, the hypervisor 120 creates a processing thread implementing a vCPU 116B associated with virtual machine 110B to be managed by virtual machine 110A. Accordingly, virtual machine 110A manages execution of virtual machine 110B allowing for pass through of devices and destruction of the processing thread of the virtual machine 110B thereby exerting control over virtual machine 110B.

Context switching is a process of storing the state of a vCPU (e.g., processing thread emulating a vCPU) so that the vCPU can be restored and resume execution (e.g., responsive to a wake up event). In an example, a context switch may occur in response to an interrupt message which may transition the vCPU to a sleep state thereby temporarily exiting to the hypervisor 120. Responsive to the interrupt, the hypervisor 120 may store the state of the vCPU to wake up the vCPU. Accordingly the vCPU can be restored and resume execution based on the stored state of the vCPU. In an example, a context switch may occur in response to an interrupt, which triggers a VMExit thus causing the VM to temporarily exit to hypervisor 120. Responsive to the interrupt, hypervisor 120 may store virtual machine context in the hypervisor memory 126, process the interrupt, and use the stored virtual machine context to resume the VM (e.g., by executing VMResume instruction).

In the shown example, hypervisor 120, based on a request from the parent virtual machine (e.g., virtual machine 110A), may create a nested virtual machine (e.g., a virtual machine 110B) to be managed by the parent virtual machine. Responsive to the request, the hypervisor 120 creates a processing thread implementing a vCPU 116B associated with virtual machine 110B to be managed by virtual machine 110A. Accordingly, virtual machine 110A manages execution of virtual machine 110B, via request to hypervisor 120. Further, virtual machine 110A may request the destruction of the processing thread of the virtual machine 110B thereby exerting control over virtual machine 110B.

Figure 2A:
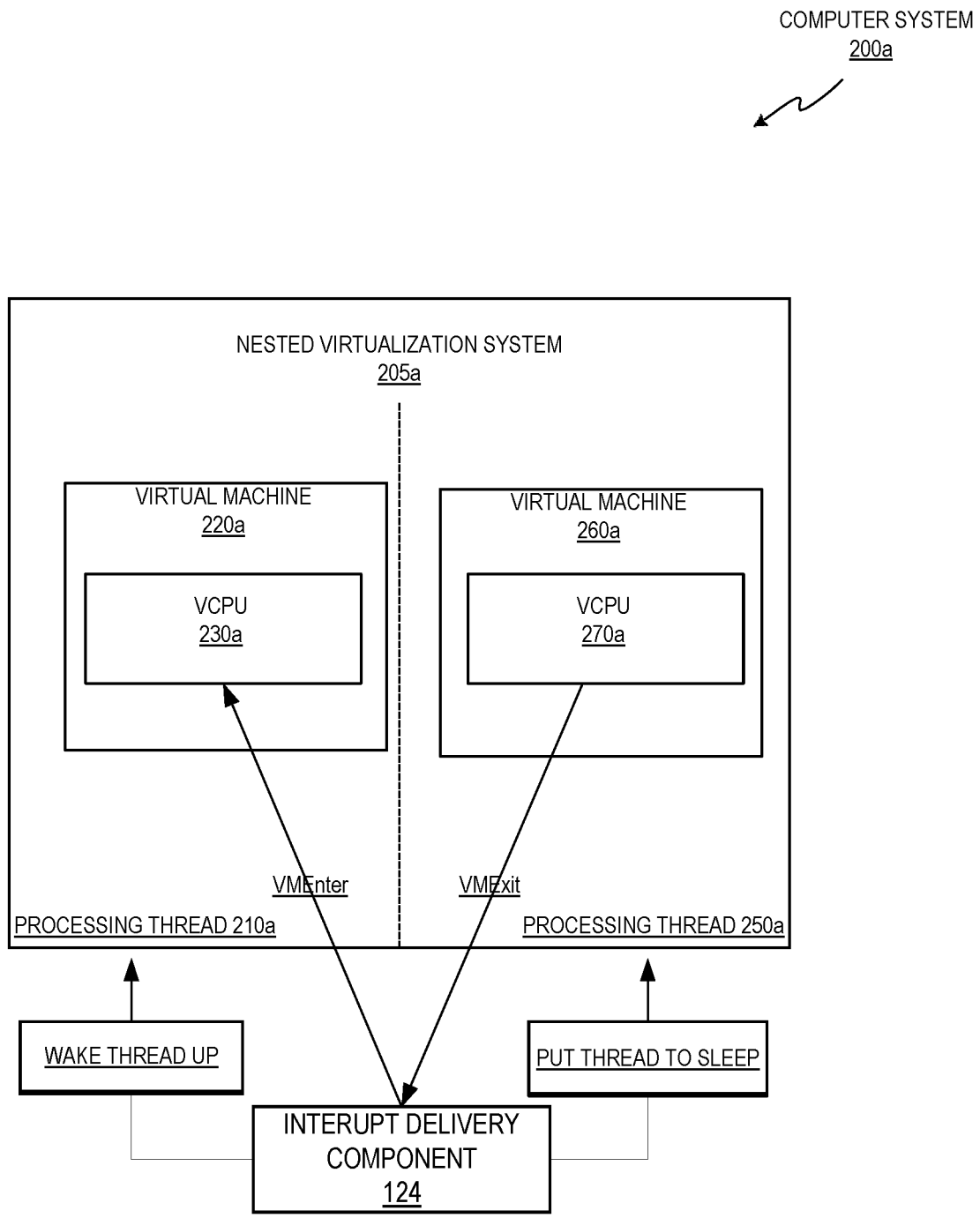
FIG. 2A depicts a block diagram illustrating components of an example nested virtualization computer system performing context switching between nested virtual machines on different processing threads, in accordance with one or more aspects of the present disclosure.

Interrupt delivery component 124 may handle delivery of interrupts between nested virtual machines. The interrupt delivery component 124 refers to a software component implemented by one or more software modules, each module associated with a set of executable instructions. Furthermore, the interrupt delivery component 124 is purely functional, i.e., interrupt delivery component 124 may be an integral part of the executable code of hypervisor 120. In an example, as shown in FIG. 2A, the hypervisor 120 may use the interrupt delivery component 124 to directly inject an interrupt to virtual machine 110B from the hypervisor 120 to interrupt virtual machine 110B (e.g., without a VMExit using posted interrupts). Accordingly, interrupts received by the hypervisor 120 can be directly injected into the appropriate virtual machine without a causing the virtual machine to perform a VMExit. With the injected interrupt, the virtual machine processes the interrupt, by performing a VMExit from the vCPU of the virtual machine with the injected interrupt. For example, a VMExit from a virtual machine due to an interrupt would cause hypervisor 120 to transition the corresponding processing thread to a sleep state and subsequently wake up another processing thread to process a VMEnter into another virtual machine, as will be discussed in more detail in regards to FIG. 2A.

Interrupt delivery component 124 may manage interrupts to assist in directly running nested virtual machines from idle. For example, since the processing thread of virtual machine 110A and the processing thread of virtual machine 110B is under the control of the hypervisor 120, injecting an interrupt into idle virtual machine 100A or virtual machine 110B involves waking up virtual machine 110A or virtual machine 110B to allow processing of the interrupt and injecting an interrupt into an active (e.g., running) virtual machine 100A or virtual machine 100B involves injecting an interrupt into the running virtual machine and resume the virtual machine to allow processing of the interrupt. Otherwise, a VMEnter instructions would be required to wake up an idle virtual machine 110A followed by a VMexit causing virtual machine 110A to transition to a sleep state and subsequently executing another VMEnter instruction to wake up virtual machine 110B. Depending on the embodiment, a scheduler decision of the running virtual machine (e.g., virtual machine 110A) may be implemented to determine when to interrupt the running virtual machine 110A to wake up idle virtual machine 110B.

In other instances, to inject an interrupt into a running virtual machine 110A while virtual machine 110B is idle includes detecting that virtual machine 110A is running and injecting an interrupt to virtual machine 110A.

As a result of the context switch between processing threads, the parent virtual machines (e.g., virtual machine 110A) which manages one or more nested virtual machines (e.g., virtual machine 110B) may in some instances be idle (e.g., transitioned to a sleep state) while nested virtual machines are running. Thus, virtual machine 110A may lose essential information that occurs with virtual machine 110B, such as, for example, runtime of virtual machine 110B and the number of interrupts injected into virtual machine 110B. Accordingly, the interrupt delivery component 124 may further include an interface that tracks the runtime of nested virtual machines (e.g., virtual machine 110B) and the number of interrupts injected into the nested virtual machines (e.g., virtual machine 110B) and stores the runtime and the number of interrupts (e.g., combining the processing thread into a single CPU) within the hypervisor memory 126 until the parent virtual machine (e.g., virtual machine 110A) is no longer idle. Once the virtual machine 110A is running, the interrupt delivery component 124 may update the guest memory 114A of the virtual machine 110A with the runtime of the nested virtual machines and the number of interrupts injected into the nested virtual machines.

Hardware devices 130 may provide hardware resources and functionality for performing computing tasks. Hardware devices 130 may include one or more physical storage devices 132, one or more physical processing devices 134, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

FIG. 2A is a block diagram illustrating example components and modules of computer system 200a, in accordance with one or more aspects of the present disclosure. Computer system 200a may comprise executable code that implements one or more of the components and modules and may be implemented within a hypervisor, a host operating system, a guest operating system, hardware firmware, or a combination thereof. In the example shown, computer system 200a may include a virtual machine 220a associated with a vCPU 230a implemented in a processing thread 210a and a virtual machine 260a associated with a vCPU 270a implemented in a processing thread 250a.

Nested virtualization system 205a may include a virtual machine 220a implemented in processing thread 210a, which may manage virtual machine 260a implemented in the processing thread 270a. The vCPU 230a of the virtual machine 220a and the vCPU 270a of the virtual machine 260a each may include an interrupt controller which may manage interrupts injected into the vCPU 230a and vCPU 270a.

By way of example, to switch between virtual machine 260a and virtual machine 220a the interrupt delivery component 124, for example, injects an interrupt into processing thread 250a associated with vCPU 270a of virtual machine 260a thereby causing a VMExit from vCPU 270a of virtual machine 260a. Responsive to the VMExit from the vCPU 270a, the interrupt delivery component 124 sends a VMEnter instructions to the processing thread 210a associated with vCPU 230a of virtual machine 220a thereby causing vCPU 230a of virtual machine 220a to wake up.

Figure 2B:
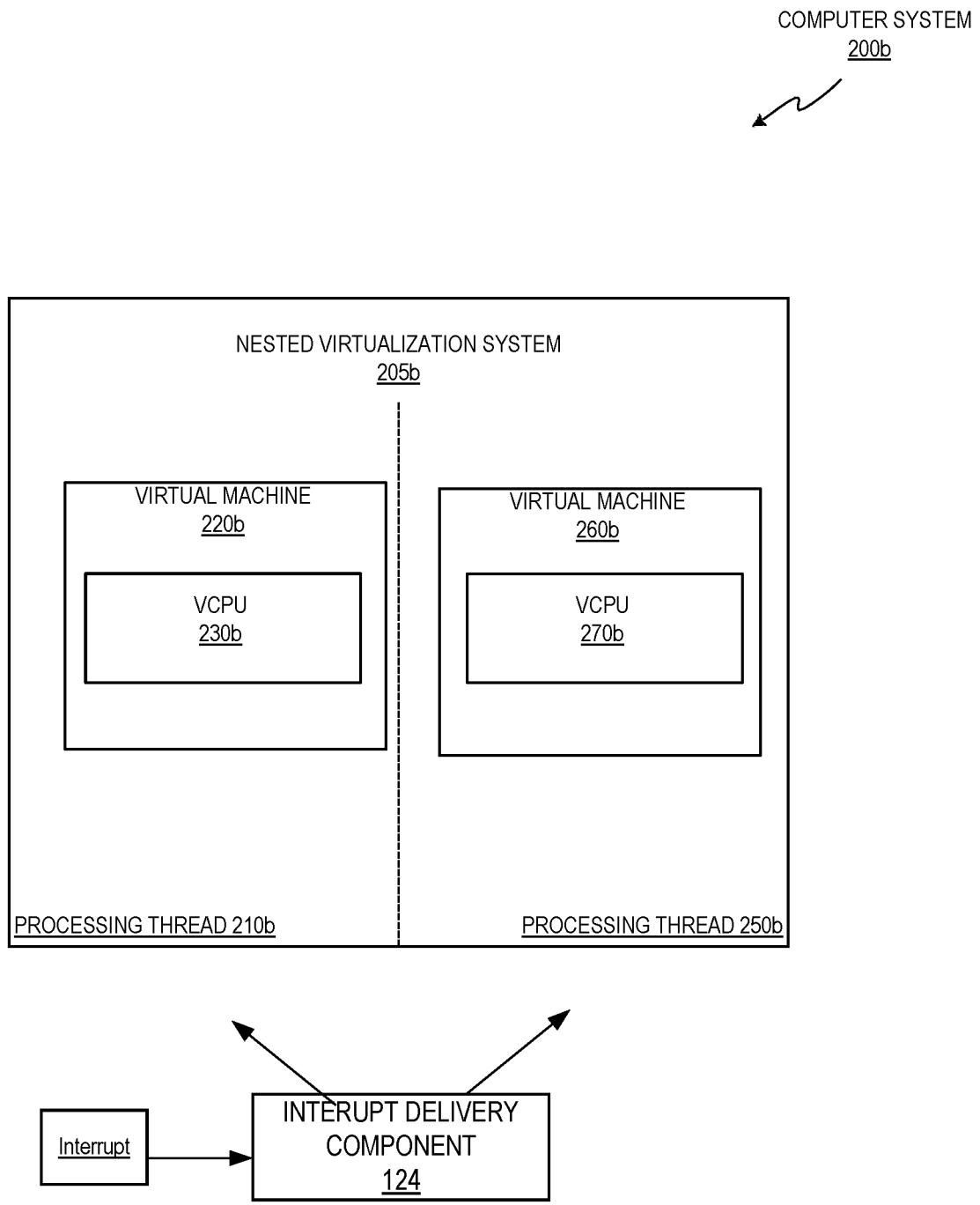
FIG. 2B depicts a block diagram illustrating components of an example nested virtualization computer system performing direct injections of interrupts to nested virtual machines on different processing threads, in accordance with one or more aspects of the present disclosure.

FIG. 2B is a block diagram illustrating example components and modules of computer system 200b, in accordance with one or more aspects of the present disclosure. Computer system 200b may comprise executable code that implements one or more of the components and modules and may be implemented within a hypervisor, a host operating system, a guest operating system, hardware firmware, or a combination thereof. In the example shown, computer system 200b may include a virtual machine 220b associated with a vCPU 230b implemented in a processing thread 210b and a virtual machine 260b associated with a vCPU 270b implemented in a processing thread 250b.

Nested virtualization system 205b may include a virtual machine 220b implemented in processing thread 210b, which may manage virtual machine 260b implemented in the processing thread 270b. The vCPU 230b of the virtual machine 220b and the vCPU 270b of the virtual machine 260b each may include an interrupt controller which may manage interrupts injected into the vCPU 230b and vCPU 270b.

By way of example, in the event the interrupt delivery component 124 receives an interrupt to be injected into virtual machine 260a or virtual machine 220a. The interrupt delivery component 124 directly injects the interrupt into virtual machine 260a or virtual machine 220a based on the interrupt received by the interrupt delivery component 124 without a VMExit or VMEnter.

Figure 3:
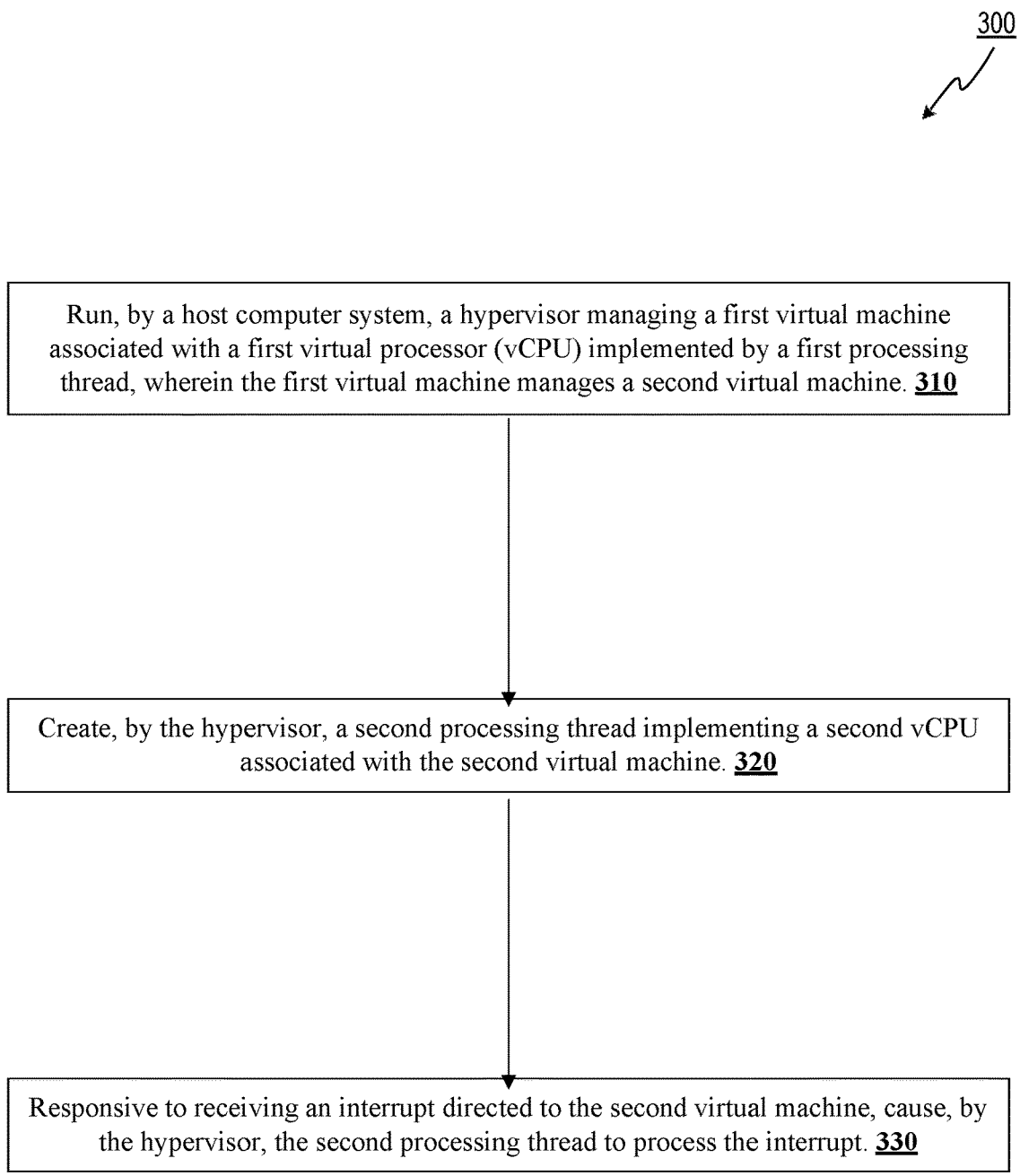
FIG. 3 depicts a flow diagram of an example method for creating processing threads for nested virtual machines, in accordance with one or more aspects of the present disclosure.

FIG. 3 depicts a flow diagram of an illustrative example of a method 300 for creating processing threads for nested virtual machines, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 300 may be performed by processing devices of a server device or a client device and may begin at block 310. At block 310, a host computer system may run a hypervisor to manage a first virtual machine associated with a first virtual processor (vCPU) implemented by a first processing thread, wherein the first virtual machine manages a second virtual machine. At block 320, the host computer system may create, by the hypervisor, a second processing thread implementing a second vCPU associated with the second virtual machine.

At block 330, the host computer system may in response to receiving an interrupt directed to the second virtual machine, cause, by the hypervisor, the second processing thread to process the interrupt. To process the interrupt includes triggering a virtual machine exit (VMExit) from the second vCPU and a triggering a virtual machine enter (VMEnter) to the first vCPU. VMExit trigger, as previously discussed, causes the second processing thread to transition to a sleep state. VMEnter trigger, as previously discussed, in the event that the first processing thread is idle a VMEnter instructions is executed by the hypervisor to wake up the first processing thread.

As previously described, during the time that the processing thread associated with the first virtual machine in a sleep state, the host computer system may maintain, in the hypervisor, a total runtime and a total number of interrupts. The total runtime refers to a runtime of the second virtual machine as part of a runtime of the first virtual machine. The total number of interrupts refer to a total number of interrupts injected into the second virtual machine (e.g., nested virtual machines) while the first virtual machine is in a sleep state as part of a number of interrupts injected into the first virtual machine.

In some instances, to maintain the total runtime and the total number of interrupts includes updating the total runtime with a runtime of the second virtual machine by adding the runtime of the second virtual machine to the total runtime and updating the total number of interrupts with the total number of interrupts injected into the second virtual machine by adding the number of interrupts injected into the second virtual machine to the total number of interrupts. In other instances, to maintain the total runtime and the total number of interrupts includes receiving, by the hypervisor, from the first virtual machine, a runtime of the first virtual machine and a number of interrupts injected into the first virtual machine and updating the total runtime and the total number of interrupts with the received runtime of the first virtual machine and the received number of interrupts injected into the first virtual machine.

The host computer system may deliver, by the hypervisor, to a memory of the first virtual machine the total runtime and the total number of interrupts. To deliver to a memory of the first virtual machine the total runtime and the total number of interrupts includes receiving, by the first virtual machine, the total runtime and the total number interrupts from the hypervisor after the first virtual machine has started running after the corresponding processing thread has been woken up.

Responsive to completing the operations described herein above with references to block 330, the method may terminate.

Figure 4:
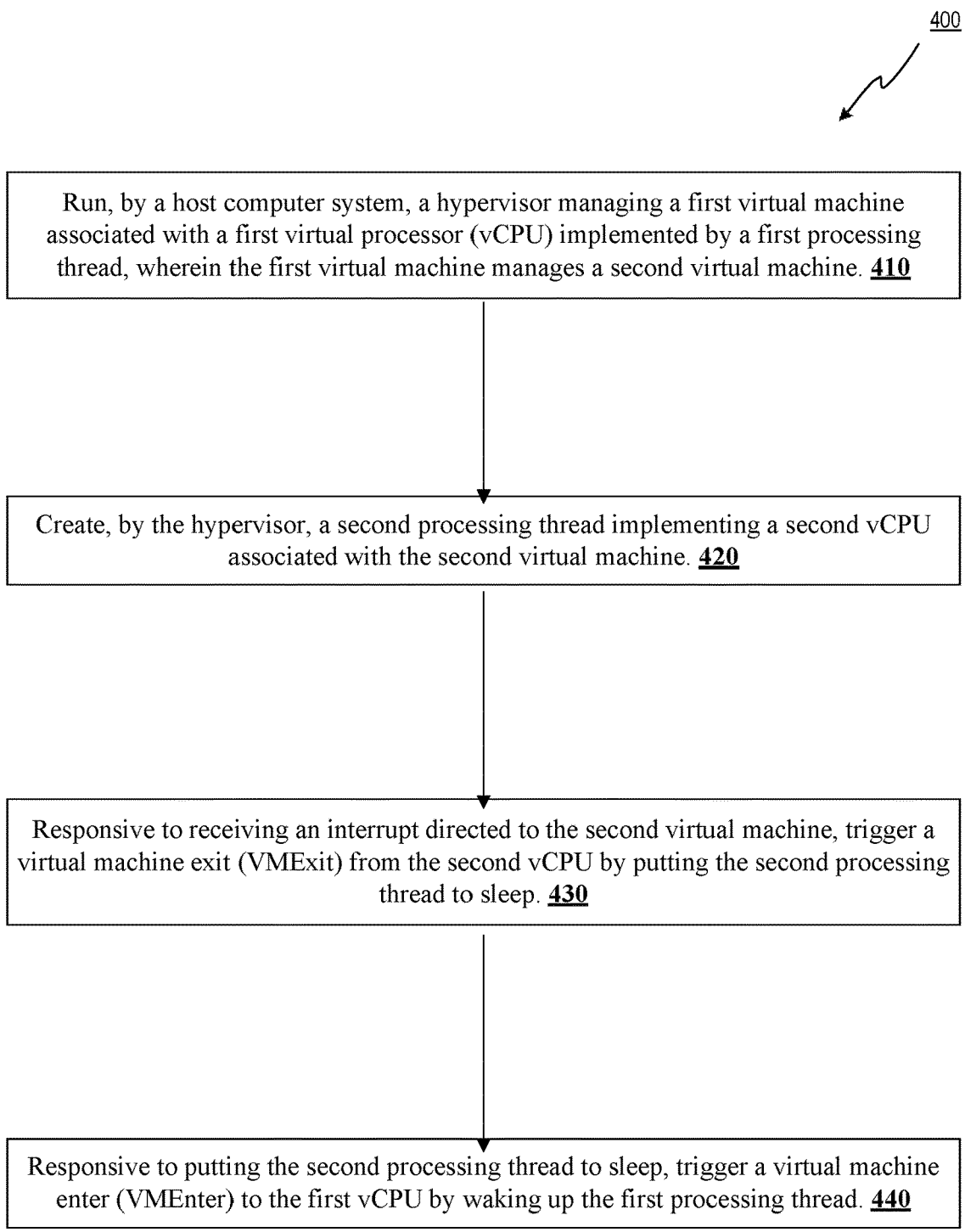
FIG. 4 depicts a block diagram of another example for creating processing threads for nested virtual machines, in accordance with one or more aspects of the present disclosure.

FIG. 4 depicts a flow diagram of an illustrative example of a method 400 for creating processing threads for nested virtual machines, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a kernel of a hypervisor as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a host computer system may run a hypervisor managing a first virtual machine associated with a first virtual processor (vCPU) implemented by a first processing thread, wherein the first virtual machine manages a second virtual machine. At block 420, the host computer system may create, by the hypervisor, a second processing thread implementing a second vCPU associated with the second virtual machine.

At block 430, the host computer system may in response to receiving an interrupt directed to the second virtual machine, trigger a virtual machine exit (VMExit) from the second vCPU by transitioning the second processing thread to a sleep state. At block 440, the host computer system may in response to transitioning the second processing thread to a sleep state, trigger a virtual machine enter (VMEnter) to the first vCPU by waking up the first processing thread.

Responsive to completing the operations described herein above with references to block 440, the method may terminate.

Figure 5:
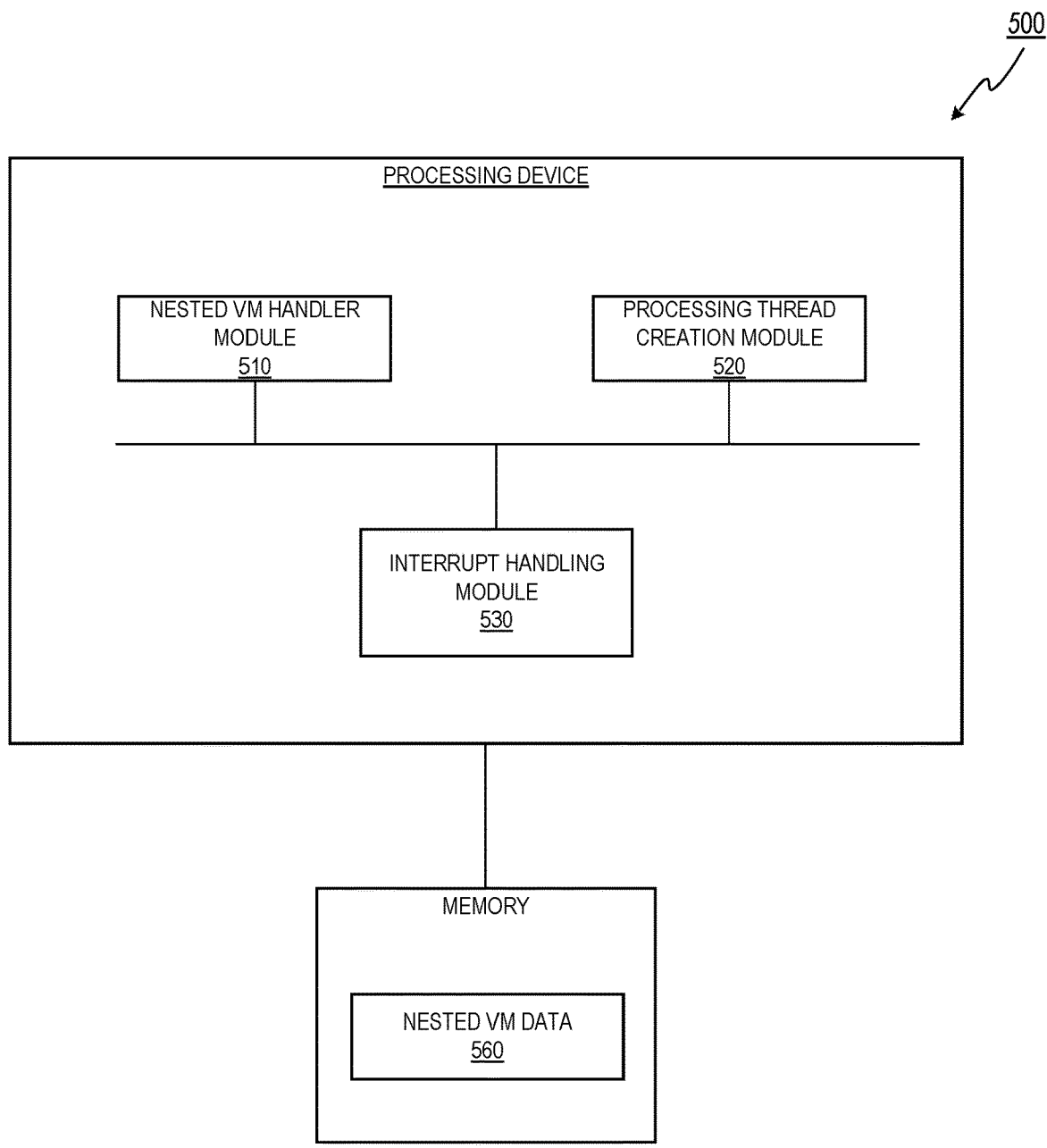
FIG. 5 depicts a block diagram of an computer system in accordance with one or more aspects of the present disclosure.

FIG. 5 depicts a block diagram of a computer system 500 operating in accordance with one or more aspects of the present disclosure. Computer system 500 may be the same or similar to computing system 100 of FIG. 1, computing system 200a of FIG. 2, or computing system 200b of FIG. 3, and may include one or more processors and one or more memory devices. In the example shown, computer system 500 may include a nested VM handler module 510, a processing thread creation module 520, an interrupt handling module 530, and nested VM data module 560.

Nested VM handler module 510 may enable a processor to run a hypervisor managing a first virtual machine associated with a first virtual processor implemented by a first processing thread in which the first virtual machine manages a second virtual machine. As previously described, the hypervisor controls physical hardware resources (e.g., bare metal) and the first virtual machine runs as a virtual machine managed by the hypervisor. The first virtual machine can run its own set of virtual machines, such as, the second virtual machine.

Processing thread creation module 520 may enable to processor to create, by the hypervisor, a second processing thread implementing a second vCPU associated with the second virtual machine. As previously described, in response to a request from the first virtual machine, the hypervisor, creates a second processing thread implementing a second vCPU associated with a second virtual machine to be managed by the first virtual machine. Processing thread creation module 520 may further enable the processor to request destruction of the processing thread of the second virtual machine thereby exerting, by the first virtual machine, control over second virtual machine.

Interrupt handling module 530 may enable the processor in response to receiving an interrupt directed to the second virtual machine, causing, by the hypervisor, the second processing thread to process the interrupt. As previously described, the hypervisor receives an interrupt directed to the second virtual machine and injects it into second the vCPU of the second virtual machine in which the second virtual machine processes the interrupt. As described previously, the interrupt causes a VMExit from the second virtual machine.

In some instances, the interrupt handling module 530, as previously described, may enable the processor to maintain a total runtime and a total number of interrupts in the nested VM data module 560 based on the first virtual machine and the second virtual machine. Once the first virtual machine is running after being idle, the interrupt handling module 530 may enable the processor to deliver, from the nested VM data module 560, the total runtime and the total number of interrupts to a memory of the first virtual machine.

As previously described, to maintain the total runtime and the total number of interrupts includes updating the total runtime with a runtime of the second virtual machine by adding the runtime of the second virtual machine to the total runtime and updating the total number of interrupts with the total number of interrupts injected into the second virtual machine by adding the number of interrupts injected into the second virtual machine to the total number of interrupts. In other instances, to maintain the total runtime and the total number of interrupts includes receiving, by the hypervisor, from the first virtual machine, a runtime of the first virtual machine and a number of interrupts injected into the first virtual machine and updating the total runtime and the total number of interrupts with the received runtime of the first virtual machine and the received number of interrupts injected into the first virtual machine.

Figure 6:
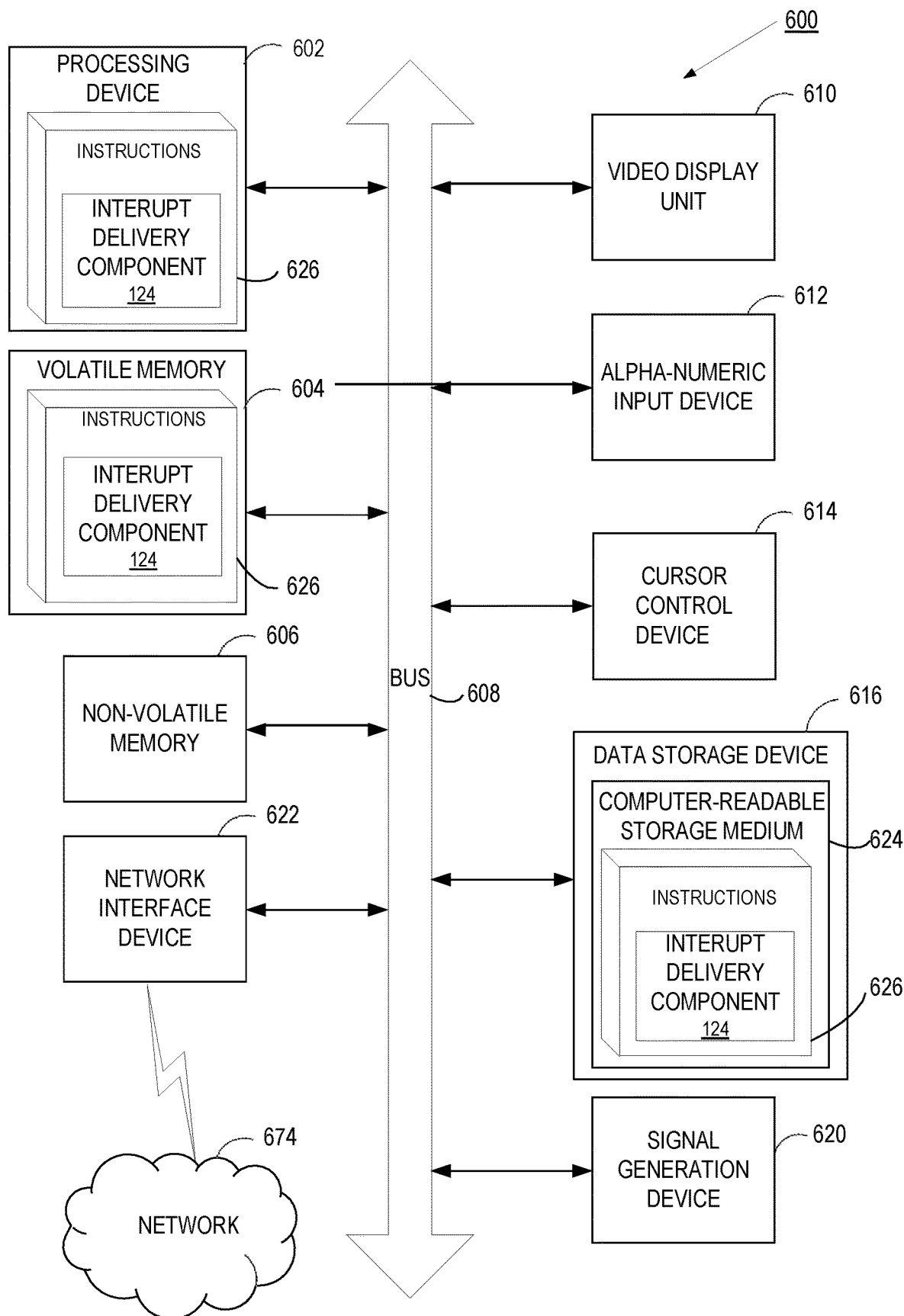
FIG. 6 depicts a block diagram of an illustrative computing device operating in accordance with examples of the present disclosure.

FIG. 6 depicts a block diagram of a computer system operating in accordance with one or more aspects of the present disclosure. In various illustrative examples, computer system 600 may correspond to computing device 100 of FIG. 1 and computing device 200 of FIG. 200. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 300 or 400 and for encoding components implemented on FIG. 1 and FIG. 6.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 or 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   running, by a host computer system, a hypervisor managing a first virtual machine associated with a first virtual processor (vCPU) implemented by a first processing thread, wherein the first virtual machine manages a second virtual machine;
   creating, by the hypervisor, a second processing thread implementing a second vCPU associated with the second virtual machine;
   responsive to receiving an interrupt directed to the second virtual machine, causing, by a processing device executing the hypervisor, the second processing thread to process the interrupt;
   maintaining, in the hypervisor, based on the first virtual machine and the second virtual machine, a total runtime and a total number of interrupts; and
   delivering, by the hypervisor to a memory of the first virtual machine, the total runtime and the total number of interrupts.

2. The method of claim 1, wherein causing the second processing thread to process the interrupt includes triggering a virtual machine exit (VMExit) from the second virtual machine and a triggering a virtual machine enter (VMEnter) to the first virtual machine.

3. The method of claim 2, wherein triggering the VMExit from the second vCPU includes causing the second processing thread to transition to a sleep state, and wherein triggering the VMEnter to the first virtual machine includes waking up the first processing thread.

4. The method of claim 2, wherein triggering the VMEnter to the first vCPU includes waking up the first processing thread.

5. The method of claim 1, wherein maintaining the total runtime and the total number of interrupts includes updating the total runtime with a runtime of the second virtual machine by adding the runtime of the second virtual machine to the total runtime and updating the total number of interrupts with a total number of interrupts injected into the second virtual machine by adding the total number of interrupts injected into the second virtual machine to the total number of interrupts.

6. The method of claim 1, wherein delivering to the memory of the first virtual machine the total runtime and the total number of interrupts comprises receiving, by the first virtual machine, the total runtime and the total number interrupts from the hypervisor after running the first virtual machine.

7. The method of claim 1, wherein maintaining the total runtime and the total number of interrupts includes receiving, by the hypervisor, from the first virtual machine, a runtime of the first virtual machine and a number of interrupts injected into the first virtual machine and updating the total runtime and the total number of interrupts with the received runtime of the first virtual machine and the received number of interrupts injected into the first virtual machine.

8. The method of claim 1, wherein the total runtime reflects a runtime of the second virtual machine as part of a runtime of the first virtual machine, and wherein the total number of interrupts reflects a number of interrupts injected into the second virtual machine as part of a number of interrupts injected into the first virtual machine.

9. The method of claim 1, wherein the first processing thread and the second processing thread are synchronized.

10. A system comprising:
a memory device;
a physical processing device operatively coupled to the memory device, to:
run, by a host computer system, a hypervisor managing a first virtual machine associated with a first virtual processor (vCPU) implemented by a first processing thread, wherein the first virtual machine manages a second virtual machine;
create, by the hypervisor, a second processing thread implementing a second vCPU associated with the second virtual machine;
responsive to a reception of an interrupt directed to the second virtual machine, cause, by the hypervisor, the second processing thread to process the interrupt;
maintain, in the hypervisor, based on the first virtual machine and the second virtual machine, a total runtime and a total number of interrupts; and
deliver, by the hypervisor to a memory of the first virtual machine, the total runtime and the total number of interrupts.

11. The system of claim 10, wherein to cause the second processing thread to process the interrupt, the physical processing device is to trigger a virtual machine exit (VMExit) from the second vCPU and trigger a virtual machine enter (VMEnter) to the first vCPU.

12. The system of claim 11, wherein to trigger the VMExit from the second vCPU, the physical processing device is to cause the second processing thread to transition to a sleep state, and wherein to trigger the VMEnter to the first vCPU, the physical processing device is to wake up the first processing thread.

13. The system of claim 11, wherein to trigger the VMEnter to the first vCPU, the physical processing device is to wake up the first processing thread.

14. The system of claim 10, wherein to maintain the total runtime and the total number of interrupts, the physical processing device is to update the total runtime with a runtime of the second virtual machine by adding the runtime of the second virtual machine to the total runtime and updating the total number of interrupts with a total number of interrupts injected into the second virtual machine by adding the total number of interrupts injected into the second virtual machine to the total number of interrupts.

15. The system of claim 10, wherein to deliver to the memory of the first virtual machine the total runtime and the total number of interrupts, the physical processing device is to receive, by the first virtual machine, the total runtime and the total number interrupts from the hypervisor after the first virtual machine is run.

16. The system of claim 10, wherein to maintain the total runtime and the total number of interrupts, the physical processing device is to receive, by the hypervisor and from the first virtual machine, a runtime of the first virtual machine and a number of interrupts injected into the first virtual machine and update the total runtime and the total number of interrupts with the received runtime of the first virtual machine and the received number of interrupts injected into the first virtual machine.

17. The system of claim 10, wherein the total runtime reflects a runtime of the second virtual machine as part of a runtime of the first virtual machine, and wherein the total number of interrupts reflects a number of interrupts injected into the second virtual machine as part of a number of interrupts injected into the first virtual machine.

18. The system of claim 10, wherein the first processing thread and the second processing thread are synchronized.

19. A non-transitory machine-readable storage medium including instructions that, when accessed by a processing device, cause the processing device to:
run, by a host computer system, a hypervisor managing a first virtual machine associated with a first virtual processor (vCPU) implemented by a first processing thread, wherein the first virtual machine manages a second virtual machine;
create, by the hypervisor, a second processing thread implementing a second vCPU associated with the second virtual machine;
responsive to receiving an interrupt directed to the second virtual machine, trigger a virtual machine exit (VMExit) from the second vCPU by putting the second processing thread to sleep;
responsive to putting the second processing thread to sleep, trigger, by the processing device, a virtual machine enter (VMEnter) to the first vCPU by waking up the first processing thread;
maintain, by the hypervisor, a total runtime based on a runtime of the first virtual machine and a runtime of the second virtual machine when the first virtual machine is idle:
maintain, by the hypervisor, a total number of interrupts based on a number of interrupts injected into the first virtual machine and a number of interrupts injected into the second virtual machine; and
update, in a memory of the first virtual machine, the runtime of the first virtual machine with the total runtime maintained by the hypervisor and the number of interrupts of the first virtual machine with the total number of interrupts maintained by the hypervisor.

20. The non-transitory machine-readable storage medium of claim 19, wherein the first processing thread and the second processing thread are synchronized.

* * * * *